(12) United States Patent
Cloud et al.

(10) Patent No.: US 11,866,176 B2
(45) Date of Patent: Jan. 9, 2024

(54) VARIABLE RECLINATION BACKREST FOR A SEAT ASSEMBLY

(71) Applicant: THE BOEING COMPANY, Chicago, IL (US)

(72) Inventors: Mark L. Cloud, Seattle, WA (US); Christopher Edward Plass, Snohomish, WA (US); Raymond Roeder, Everett, WA (US); Dean Hettick, Snohomish, WA (US); Anis Noorani, Everett, WA (US)

(73) Assignee: The Boeing Company, Chicago, IL (US)

(*) Notice: Subject to any disclaimer, the term of this patent is extended or adjusted under 35 U.S.C. 154(b) by 416 days.

(21) Appl. No.: 16/529,957

(22) Filed: Aug. 2, 2019

(65) Prior Publication Data

US 2020/0307800 A1   Oct. 1, 2020

Related U.S. Application Data

(60) Provisional application No. 62/825,874, filed on Mar. 29, 2019.

(51) Int. Cl.
*B64D 11/06* (2006.01)
(52) U.S. Cl.
CPC ........ *B64D 11/064* (2014.12); *B64D 11/0696* (2013.01)
(58) Field of Classification Search
None
See application file for complete search history.

(56) References Cited

U.S. PATENT DOCUMENTS

| 2,522,246 | A | * | 9/1950 | Armstrong | A47C 1/03216 297/322 |
| 3,589,209 | A | * | 6/1971 | Howell | F16C 1/14 74/501.6 |
| 4,155,433 | A | * | 5/1979 | Porter | B60N 2/231 188/300 |
| 4,498,703 | A | * | 2/1985 | Schmidhuber | B60N 2/231 248/371 |
| 4,749,013 | A | * | 6/1988 | Ducate, Sr. | B23Q 11/0025 409/87 |
| 5,029,822 | A | * | 7/1991 | Selzer | B64D 11/064 267/64.12 |

(Continued)

FOREIGN PATENT DOCUMENTS

CN     206929268 U  *  1/2018
CN     216591012 U  *  5/2022

OTHER PUBLICATIONS

U.S. Appl. No. 16/365,788, filed Mar. 27, 2019.
(Continued)

*Primary Examiner* — David E Allred
(74) *Attorney, Agent, or Firm* — Joseph M. Butscher; The Small Patent Law Group LLC (57) ABSTRACT

A seat assembly includes a backrest that is configured to recline over a reclination range, and a variable reclination range limiter that is configured to selectively adjust a limit of the reclination range limit. A variable reclination range limiting method for a seat assembly includes allowing a backrest of the seat assembly to recline over a reclination range, and selectively adjusting a limit of the reclination range by a variable reclination range limiter.

20 Claims, 5 Drawing Sheets

(56) References Cited

U.S. PATENT DOCUMENTS

| | | | | |
|---|---|---|---|---|
| 5,216,842 A * | 6/1993 | Phillips | B24B 7/241 | |
| | | | 451/41 | |
| 6,220,581 B1 * | 4/2001 | Mueller | B62K 19/36 | |
| | | | 267/64.11 | |
| 7,713,009 B2 | 5/2010 | Hudson | | |
| 7,785,053 B2 | 8/2010 | Hudson | | |
| 8,128,326 B2 | 3/2012 | Hudson | | |
| 8,864,092 B2 * | 10/2014 | Newville | F16M 13/02 | |
| | | | 361/679.01 | |
| 8,920,085 B2 | 12/2014 | Hudson | | |
| 9,567,086 B2 | 2/2017 | Siegmeth | | |
| 2003/0209929 A1 * | 11/2003 | Muin | B64D 11/0649 | |
| | | | 297/331 | |
| 2011/0148167 A1 * | 6/2011 | Westerink | B64D 11/06 | |
| | | | 297/354.12 | |
| 2011/0187166 A1 * | 8/2011 | Walsh | B62J 1/06 | |
| | | | 297/215.13 | |
| 2011/0193386 A1 * | 8/2011 | Gaither | B60N 2/242 | |
| | | | 297/316 | |
| 2012/0032062 A1 * | 2/2012 | Newville | F16M 11/2092 | |
| | | | 248/575 | |
| 2012/0139302 A1 * | 6/2012 | Estevenin | B64D 11/0638 | |
| | | | 297/162 | |
| 2018/0065521 A1 * | 3/2018 | Vela | B64D 11/064 | |
| 2019/0071182 A1 * | 3/2019 | Ward | B64D 11/0648 | |
| 2019/0152607 A1 * | 5/2019 | Pinger | B64D 11/0648 | |

OTHER PUBLICATIONS

U.S. Appl. No. 16/365,777, filed Mar. 27, 2019.
U.S. Appl. No. 16/529,921, filed Aug. 2, 2019.
U.S. Appl. No. 16/529,935, filed Aug. 2, 2019.
U.S. Appl. No. 16/671,226, filed Nov. 1, 2019.
U.S. Appl. No. 16/529,946, filed Aug. 2, 2019.
U.S. Appl. No. 16/368,925, filed Mar. 29, 2019.
U.S. Appl. No. 16/367,314, filed Mar. 28, 2019.
U.S. Appl. No. 16/368,934, filed Mar. 29, 2019.
U.S. Appl. No. 16/671,238, filed Nov. 1, 2019.

* cited by examiner

VARIABLE RECLINATION BACKREST FOR A SEAT ASSEMBLY

RELATED APPLICATIONS

This application relates to and claims priority benefits from U.S. Provisional Patent Application No. 62/825,874, entitled "Variable Reclination Backrest for a Seat Assembly," filed Mar. 29, 2019, which is hereby incorporated by reference in its entirety.

FIELD OF EMBODIMENTS OF THE DISCLOSURE

Embodiments of the present disclosure generally relate to seat assemblies, and more particularly, to seat assemblies having variable reclination backrests.

BACKGROUND OF THE DISCLOSURE

Commercial aircraft typically include an internal cabin that may be divided into numerous sections. A cockpit is generally separated from a passenger cabin, which may include a first class section, a business class section, an economy section, and the like. Each section within a passenger cabin may have a different spacing or pitch between rows of seats. For example, a first class section typically has a greater pitch between rows of seats as compared to an economy section.

A typical passenger seat within an internal cabin of an aircraft includes a backrest that is able to recline. The range of reclination of the backrest is typically fixed. A passenger may selectively recline the backrest between a fully upright position and a fully reclined position. However, when the backrest is reclined, space for a passenger behind the reclined seat is typically reduced, particularly when the pitch between the seats is relatively short.

Further, between flights of an aircraft, an operator may decide to reconfigure certain seating areas to adjust the pitch between certain rows of seats. For example, an operator may decide to change a row of an economy section into an economy plus section, or vice versa. The pitch between rows of the economy section may differ from the pitch between rows of the economy plus section.

As can be appreciated, a seat having a backrest in a reclined position may encroach upon space of a passenger seated behind the reclined seat. Further, if pitch between rows of seats is reduced between flights, reclined seats may reduce passenger space even further.

SUMMARY OF THE DISCLOSURE

A need exists for a system and method for selectively limiting a reclination range of backrests of seats within an internal cabin of an aircraft. Further, a need exists for a system and method that allow for quick and efficient adjustment of a backrest reclining range, such as when a seat configuration onboard a commercial aircraft is changed between flights.

With those needs in mind, certain embodiments of the present disclosure provide a seat assembly including a backrest that is configured to recline over a reclination range, and a variable reclination range limiter that is configured to selectively adjust a limit of the reclination range limit.

In at least one embodiment, the seat assembly includes one or more securing studs that are configured to secure the seat assembly to one or more seat tracks within an internal cabin of a vehicle. A base may support the backrest and a seat cushion.

In at least one embodiment, the reclination range extends between a fully upright position and a fully reclined position. The variable reclination limiter selectively adjusts the limit of the reclination range between the fully upright position and the fully reclined position. The variable reclination limiter selectively adjusts the limit of the reclination range to a limited reclination position that is between the fully reclined position and the fully upright position.

In at least one embodiment, the seat assembly includes a recline piston coupled to the backrest. The variable reclination range limiter may be coupled to the recline piston. The variable reclination range limiter may include a stroke-limiting sleeve that is adjustably coupled to the recline piston.

The variable reclination range limiter may be coupled to a pivot axle that defines a pivot point for the backrest. The variable reclination range limiter may include a moveable restricting member that is proximate to a pivot axle of the backrest.

Certain embodiments of the present disclosure provide a variable reclination range limiting method for a seat assembly. The variable reclination range limiting method includes allowing a backrest of the seat assembly to recline over a reclination range, and selectively adjusting a limit of the reclination range by a variable reclination range limiter.

The variable reclination range limiting method may also include securing the seat assembly to one or more seat tracks within an internal cabin of a vehicle with one or more securing studs. The variable reclination limiting method may also include supporting the backrest and a seat cushion with a base.

In at least one embodiment, the selectively adjusting includes selectively adjusting the limit of the reclination range between the fully upright position and the fully reclined position. In at least one embodiment, the selectively adjusting includes selectively adjusting the limit of the reclination range to a limited reclination position that is between the fully reclined position and the fully upright position.

In at least one embodiment, the variable reclination range limiting method includes coupling the variable reclination range limiter to a recline piston. In at least one embodiment, the variable reclination range limiting method includes coupling the variable reclination range limiter to a pivot axle that defines a pivot point for the backrest. In at least one embodiment, the variable reclination range limiting method includes positioning a moveable restricting member of the variable reclination range proximate to a pivot axle of the backrest.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a seat assembly having a variable reclination backrest that is configured to recline over a reclination range. A variable reclination range limiter is configured to selectively adjust a limit of the reclination range (that is, a reclination range limit) of the backrest. The limit of the reclination range is the point past which the backrest is unable to further recline. That is, the limit of the reclination range is an end point or level of reclination.

Embodiments of the present disclosure provide systems and methods that allow for quick and efficient adjustment of a reclination range of a backrest of a seat assembly. As such, the reclination range of backrests may be quickly and easily adjusted when a seating configuration within an internal cabin of an aircraft is changed between flights.

Figure 1:
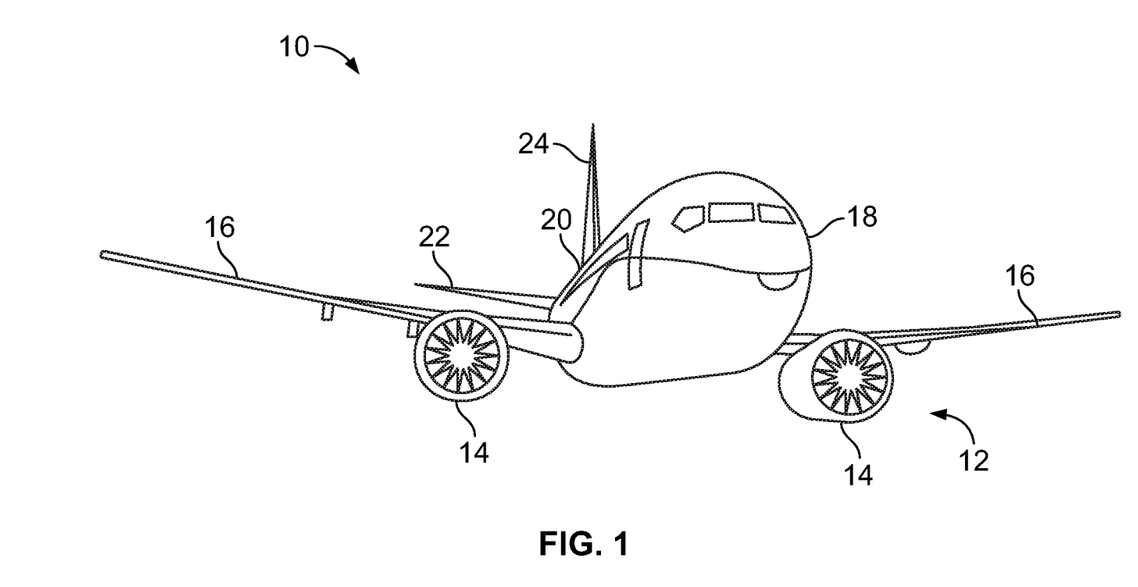
FIG. 1 illustrates a perspective front view of an aircraft, according to an embodiment of the present disclosure.

FIG. 1 illustrates a perspective top view of a vehicle, such as an aircraft 10, according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may be defined by interior sidewall panels that connect to a ceiling and a floor. The internal cabin may include a cockpit, one or more work sections (for example, galleys, personnel carry-on baggage areas, and the like), one or more passenger sections (for example, first class, business class, and economy sections), and an aft section in which an aft rest area assembly may be positioned. Overhead stowage bin assemblies may be positioned throughout the internal cabin.

Alternatively, instead of an aircraft, embodiments of the present disclosure may be used with various other vehicles, such as automobiles, buses, locomotives and train cars, seacraft, spacecraft, and the like.

Figure 2A:
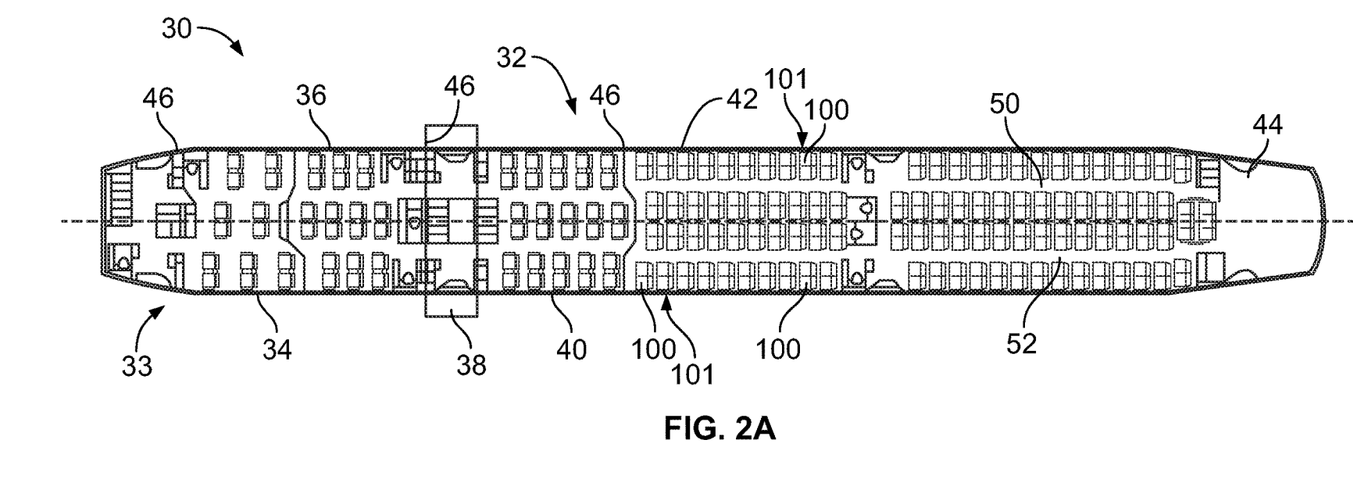
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define an interior of the internal cabin 30. The interior of the internal cabin 30 is defined by sidewall panels that connect to a ceiling and a floor. The sidewall panels include lateral segments that connect to ceiling segments. The lateral segments define lateral wall portions, while the ceiling segments define at least portions of the ceiling within the internal cabin 30.

The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Seat assemblies 100 are positioned throughout the internal cabin 30. The seat assemblies 100 may be arranged in rows 101. Spacing or pitch between rows 101 of adjacent seat assemblies 100 may be changed, such as between flights. As described herein, one or more of the seat assemblies 100 includes a variable reclination backrest.

Figure 2B:
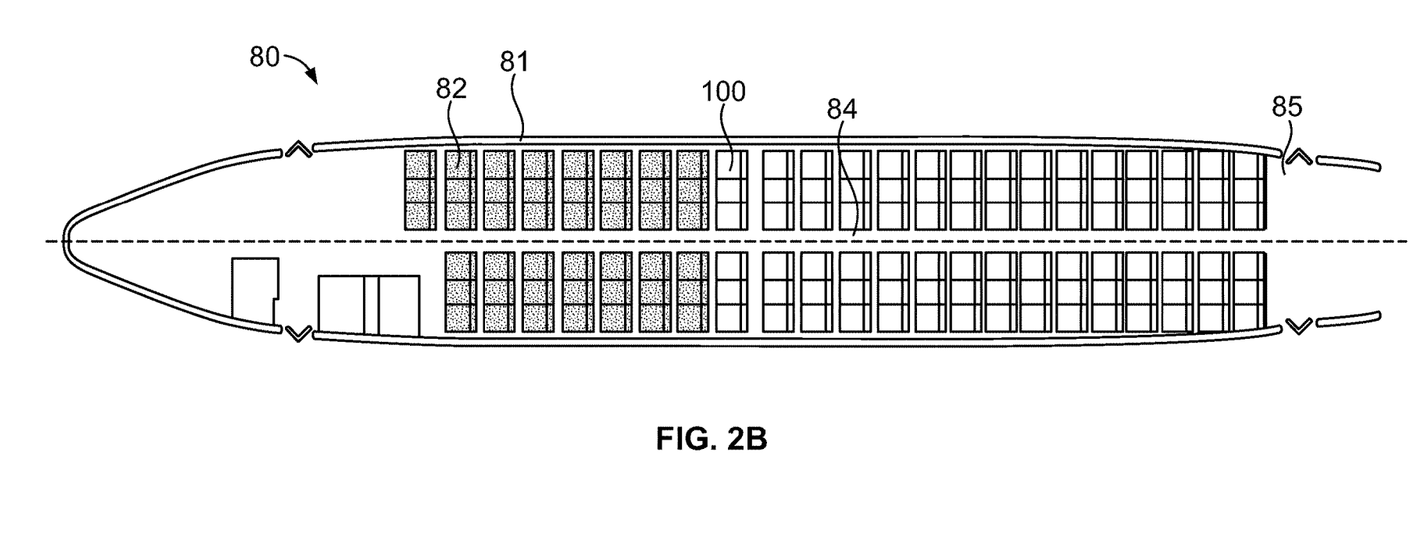
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the interior of the internal cabin 80. The internal cabin 80 includes multiple sections, including a main cabin 82 having passenger seat assemblies 100, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Figure 3:
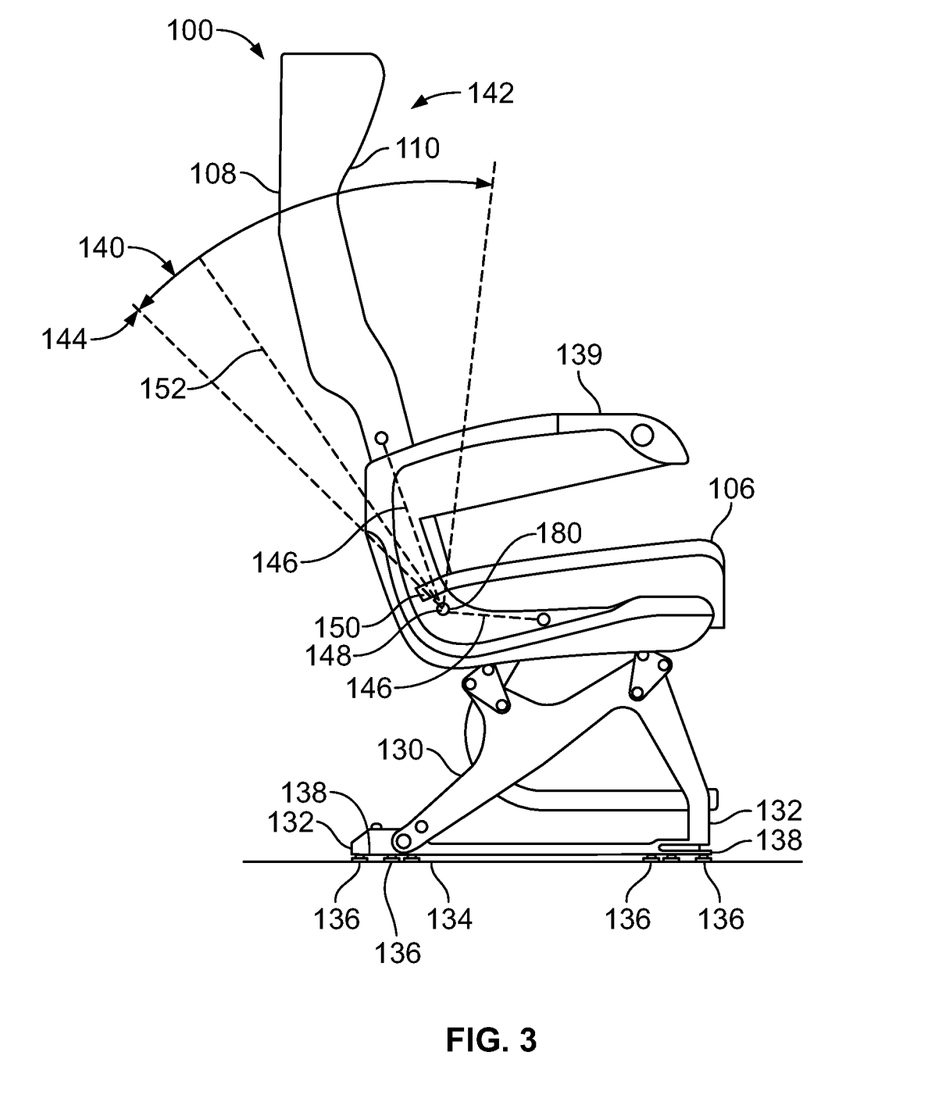
FIG. 3 illustrates a side view of a seat assembly, according to an embodiment of the present disclosure.

FIG. 3 illustrates a side view of a seat assembly 100, according to an embodiment of the present disclosure. The seat assembly 100 is configured to be secured within an internal cabin of a vehicle, such as a commercial aircraft.

The seat assembly 100 includes a base 130, which may include legs 132 that may be secured to seat tracks 134 within a cabin of a vehicle. In at least one embodiment, securing studs 136 (such as shear studs) downwardly extend from lower surfaces 138 of the legs 132. The securing studs 136 are securely retained within the seat tracks 134. The seat tracks 134 are configured to securely couple to the securing studs 136 to secure the seat assembly 100 in place. The base 130 supports a seat cushion 106 and a backrest 108, which includes a headrest 110. Arm rests 139 may be pivotally secured to the backrest 108.

The seat assembly 100 may be sized and shaped differently than shown in FIG. 3. The seat assembly 100 may include more or less components than shown in FIG. 3. It is to be understood that the seat assembly 100 shown in FIG. 3 is merely one example of a seat assembly that may be disposed within an internal cabin of a vehicle.

The backrest 108 is able to recline over a full reclination range 140. In particular, the backrest 108 is able to be selectively reclined from a fully upright position 142, as shown in FIG. 3, and a fully reclined position 144.

Recline pistons 146 control the extent and rate of reclination. The recline pistons 146 may be coupled to a portion of the base 130, such as to a side and underneath the seat cushion 106, and a portion of the backrest 108, such as to a side of the backrest 108. The recline piston 146 controls reclination of the backrest with respect to a pivot point 148, which may be defined by a pivot axle 180. That is, the backrest 108 reclines about the pivot point(s) 148. In at least one embodiment, the recline pistons 146 push back on the backrest 108 to recline the backrest 108 about the pivot point(s) 148. In at least one other embodiment, the recline pistons 146 may be or be part of levers that recline the backrest 108 about the pivot point(s) 148. The pivot axle 180 may be a single bar that spans across a width of the backrest 108, or multiple bars, for example, at connection areas, such as between the backrest 108 and the base 130.

In at least one embodiment, a recline piston 146 is positioned on each side of the seat assembly 100. Optionally, a recline piston 146 may be on one side of the seat assembly 100.

Embodiments of the present disclosure provide that the backrest 108 is a variable reclination backrest in which the reclination range 140 may be limited. That is, embodiments of the present disclosure include a variable reclination range limiter 150 that allows for selective adjustment of the reclination range 140. The variable reclination range limiter 150 is operable to selectively adjust a limit of the reclination range between the fully upright position 142 and the fully reclined position 144. In particular, the variable reclination range limiter 150 is configured to selectively limit the reclination range from the fully upright position to a limited reclination position that is less than the fully reclined position (such as to a limited reclination position 152 that is between the fully reclined position 144 and the fully upright position 142).

In at least one embodiment, the variable reclination range limiter 150 is coupled to the recline piston 146. The variable reclination range limiter 150 may be movably coupled to a portion of the recline piston 146 to selectively adjust a reclination range limit of the backrest 108.

In at least one other embodiment, the variable reclination range limiter 150 is coupled to a pivot axle that defines the pivot point 148. In this embodiment, the variable reclination range limiter 150 is able to move the pivot point 148 in order to selectively adjust the reclination range limit of the backrest 108. For example, the variable reclination range limiter 150 may be or otherwise include an over-center bi-stable relocation device that selectively controls a location of the pivot point 148. The relocation device may be a pneumatic or hydraulic device. In at least one other embodiment, the relocation device may be an electric motor.

In at least one other embodiment, the variable reclination range limiter 150 includes a moveable member (such as a panel, bar, or the like) that is proximate to a pivot axle of the backrest 108. The moveable member is adjusted to selectively adjust the reclination range limit of the backrest 108.

Figure 4:
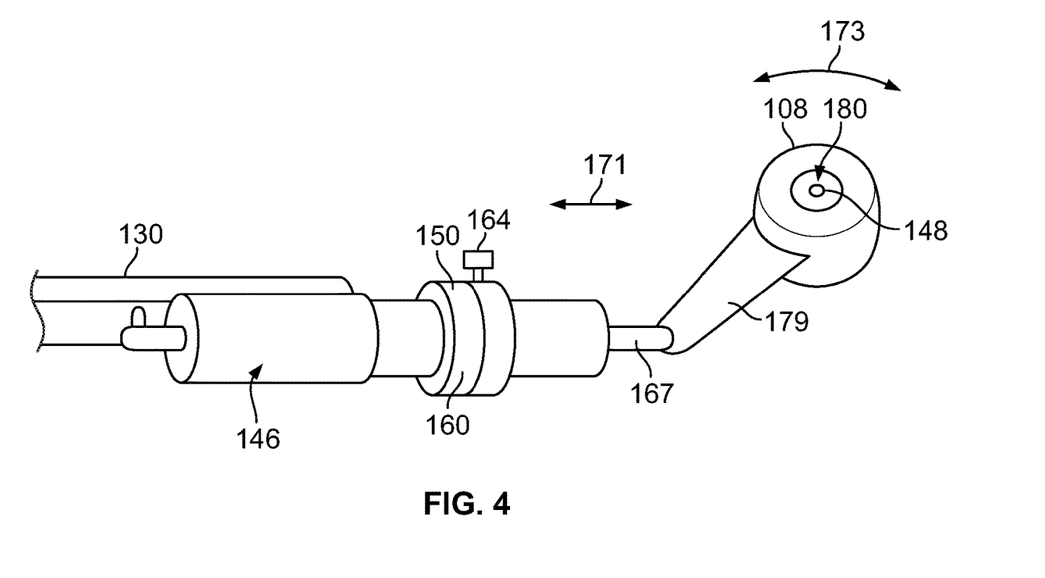
FIG. 4 illustrates a perspective view of a variable reclination range limiter coupled to a recline piston, according to an embodiment of the present disclosure.

FIG. 4 illustrates a perspective view of the variable reclination range limiter 150 coupled to the recline piston 146, according to an embodiment of the present disclosure. In this embodiment, the variable reclination range limiter 150 is a stroke-limiting sleeve 160 that is adjustably mounted on a shaft 162 of the recline piston 146. A securing device 164, such as a fastener (for example, an engageable bolt, a spring-biased clip, and/or the like) is coupled to the stroke-limiting sleeve 160. The securing device 164 passes through a portion of the stroke-limiting sleeve 160 and engages a portion of the shaft 162 (such as a defined fastener recess or hole) to lock the stroke-limiting sleeve 160 in position.

In at least one embodiment, the recline piston 146 pushes and pulls back with respect to a bracket 179 of the backrest 108 in the directions of arrows 171 to pivot the backrest 108 about the pivot axle 180 in the directions of arc 173. In at least one other embodiment, the recline piston 146 may provide a lever arm that pivots along with the backrest about the pivot axle 180.

Referring to FIGS. 3 and 4, in order to adjust the reclination range of the backrest 108, an individual loosens the securing device 164 so that the securing device 164 disengages the shaft 162. As such, the stroke-limiting sleeve 160 may be slid over the shaft 162 to a desired point, at which the securing device 164 may be manipulated to securely fix the stroke-limiting sleeve 160 in place.

The limit of the reclination range for the backrest 108 increases (that is, the range of the backrest 108 to recline increases) the closer the stroke-limiting sleeve 160 is to a seat coupler, which secures the recline piston 146 proximate to the pivot point 148. Conversely, the recline range for the backrest 108 decreases (that is, the range of the backrest 108 to recline decreases) the closer the stroke-limiting sleeve 160 is to a backrest coupler 167, which secures the recline piston 146 to the backrest 108.

The stroke-limiting sleeve 160 may be quickly and easily adjusted by personnel, such as between flights. That is, an individual simply manipulates the securing device 164 and adjusts the stroke-limiting sleeve 160 in relation to the shaft 162 to adjust a reclination range limit of the backrest 108.

Figure 5:
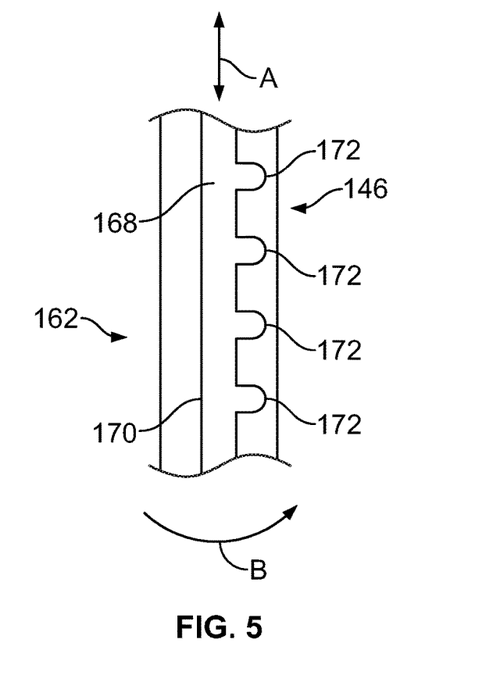
FIG. 5 illustrates a lateral view of a shaft of a recline piston, according to an embodiment of the present disclosure.

FIG. 5 illustrates a lateral view of the shaft 162 of the recline piston 146, according to an embodiment of the present disclosure. In this embodiment, an adjustment track 168 is formed into and/or through the shaft 162. The adjustment track 168 includes a longitudinal channel 170 and a plurality of position-retaining channels 172.

Referring to FIGS. 4 and 5, the stroke-limiting sleeve 160 may include an internal pin, beam, or the like that is moveably coupled to the adjustment track 168. The stroke-limiting sleeve 160 may be adjusted along the shaft 162 in the direction of arrows A, and rotated into a position-retaining channel 172 in the direction of arc B in order to set the stroke-limiting sleeve 160 at a desired position, which, in turn, sets a reclination range limit. As such, in this embodiment, an individual may quickly and easily adjust the reclination range limit without manipulating a specific securing device 164. In at least one embodiment, a securing device that is engageable by an individual is not coupled to the stroke-limiting sleeve 160.

Figure 6:
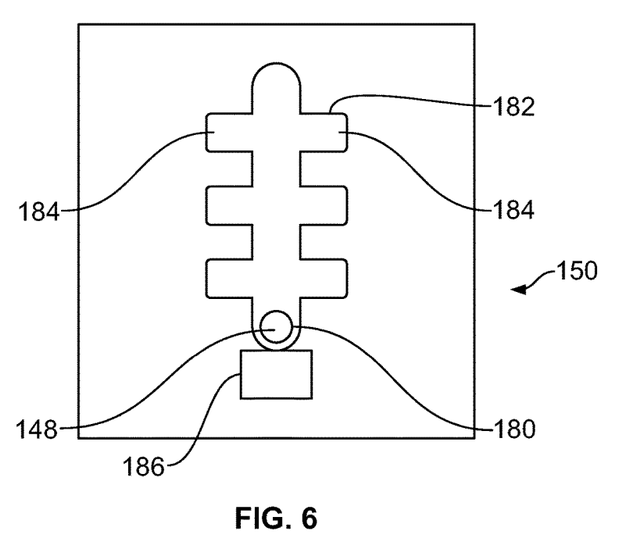
FIG. 6 illustrates a front view of a variable reclination range limiter coupled to a pivot axle, according to an embodiment of the present disclosure.

FIG. 6 illustrates a front view of a variable reclination range limiter 150 coupled to the pivot axle 180, according to an embodiment of the present disclosure. The pivot axle 180 may be pivotally retained within a track 182, such as formed in a panel, plate, or the like within and/or proximate to the backrest 108 (shown in FIG. 3). The track 182 includes a plurality of position-retaining channels 184, each of which is able to accept and retain the pivot axle 180. In this manner, the pivot axle 180 may be moved to a different position-retaining channel 184 to change the location of the pivot point 148 (shown in FIG. 3). For example, an individual may grasp the pivot axle 180 and move the pivot axle 180 to a different position within the track 182. A clamp or other such securing device may be coupled to the pivot axle 180 to secure the pivot axle 180 in position. Optionally, the track 182 may include integral retainers, such as constricted areas, that secure the pivot axle 180 in position.

Optionally, the variable reclination range limiter 150 may be or otherwise include an over-center bi-stable relocation device 186 that is operatively coupled to the pivot axle 180, and is configured to selectively control a location of the pivot point 148. The relocation device 186 may be a pneumatic or hydraulic device. In at least one other embodiment, the relocation device 186 may be an electric motor.

Figure 7:
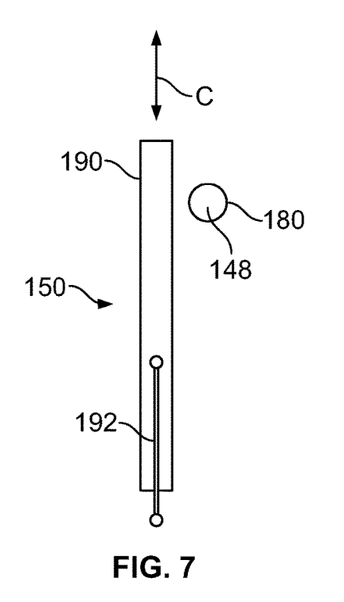
FIG. 7 illustrates a lateral view of a variable reclination range limiter proximate to a pivot axle that defines a pivot point, according to an embodiment of the present disclosure.

FIG. 7 illustrates a lateral view of a variable reclination range limiter 150 proximate to the pivot axle 180 that defines the pivot point 148, according to an embodiment of the present disclosure. In this embodiment, the variable reclination range limiter 150 includes a restricting member 190 (such as one or more plate(s), bar(s), or the like) behind at least a portion of the pivot axle 180. The restricting member 190 is moveable in the direction of arrows C. Referring to FIGS. 3 and 7, the restricting member 190 may be disposed at a location behind the seat cushion and behind or within the backrest 108. The restricting member 190 may be coupled to lateral brackets 192, which may be securely coupled to the backrest 108 and/or other portions of the seat assembly 100. The restricting member is configured to be moved and set in the directions of arrow C. As the plate is moved up, the reclination range limit of the backrest 108 decreases. Conversely, as the plate is moved down, the reclination range limit of the backrest increases.

Examples of variable reclination range limiters 150 are shown and described with respect to FIGS. 4-7. It is to be understood that these are merely examples of variable reclination range limiters 150, and the present application is not limited thereto. Further, embodiments of the present disclosure may include variable reclination range limiters 150 that include two or more of the examples.

Other examples of variable reclination range limiters 150 include removable clamps, which may be secured to the recline piston 146, a follower bar, and/or the like. Additional examples of variable reclination range limiters 150 includes stroke-limiting spacers coupled to the recline piston 146, a follower bar, and/or the like. Further examples of variable reclination range limiters 150 include spring-biased devices coupled to the pivot axle 180, the recline piston 146, a follower bar, and/or the like.

Figure 8:
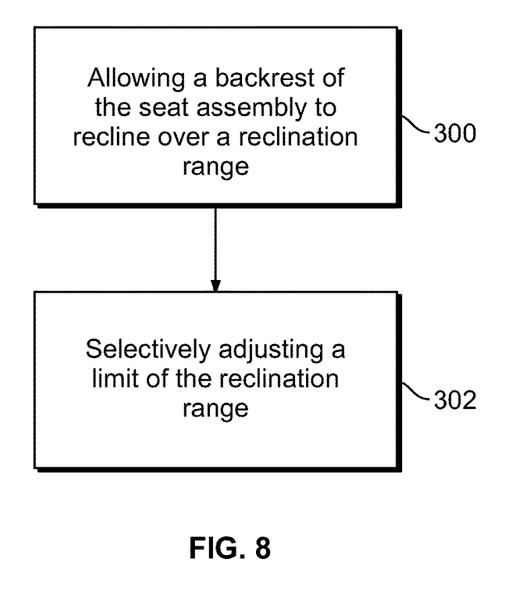
FIG. 8 illustrates a flow chart of a variable reclination range limiting method for a seat assembly, according to an embodiment of the present disclosure.

FIG. 8 illustrates a flow chart of a variable reclination range limiting method for a seat assembly. The variable reclination range limiting method includes allowing (300) a backrest of the seat assembly to recline over a reclination range, and selectively adjusting (302) a limit of the reclination range by a variable reclination range limiter.

The variable reclination range limiting method may also include securing the seat assembly to one or more seat tracks within an internal cabin of a vehicle with one or more securing studs. The variable reclination limiting method may also include supporting the backrest and a seat cushion with a base.

In at least one embodiment, the selectively adjusting includes selectively adjusting the limit of the reclination range between the fully upright position and the fully reclined position. In at least one embodiment, the selectively adjusting includes selectively adjusting the limit of the reclination range to a limited reclination position that is between the fully reclined position and the fully upright position.

In at least one embodiment, the variable reclination range limiting method includes coupling the variable reclination range limiter to a recline piston. In at least one embodiment, the variable reclination range limiting method includes coupling the variable reclination range limiter to a pivot axle that defines a pivot point for the backrest. In at least one embodiment, the variable reclination range limiting method includes positioning a moveable restricting member of the variable reclination range proximate to a pivot axle of the backrest.

As described herein, embodiments of the present disclosure provide systems and methods for selectively limiting a reclination range of backrests of seat assemblies within an internal cabin of an aircraft. Also, embodiments of the present disclosure provide systems and methods that allow for quick and efficient adjustment of a backrest reclination range, such as when a seat configuration onboard a commercial aircraft is changed between flights.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A seat assembly comprising:
a backrest that is configured to recline over a reclination range; and
a variable reclination range limiter that is configured to selectively adjust a limit of the reclination range, wherein the variable reclination range limiter is coupled to a recline piston and a pivot axle that defines a pivot point for the backrest, and wherein the variable reclination range limiter comprises:
a stroke-limiting sleeve mounted on a shaft of the recline piston, wherein the recline piston is configured to push and pull with respect to a bracket of the backrest about the pivot axle; and
a securing device coupled to the stroke-limiting sleeve, wherein the securing device passes through a portion of the stroke-limiting sleeve and engages a portion of the shaft of the recline piston to lock the stroke-limiting sleeve in position.

2. The seat assembly of claim 1, further comprising one or more securing studs that are configured to secure the seat assembly to one or more seat tracks within an internal cabin of a vehicle.

3. The seat assembly of claim 1, further comprising a base that supports the backrest and a seat cushion.

4. The seat assembly of claim 1, wherein the reclination range extends between a fully upright position and a fully reclined position.

5. The seat assembly of claim 4, wherein the variable reclination limiter selectively adjusts the limit of the reclination range between the fully upright position and the fully reclined position.

6. The seat assembly of claim 5, wherein the variable reclination limiter selectively adjusts the limit of the reclination range to a limited reclination position that is between the fully reclined position and the fully upright position, and wherein the variable reclination limiter prevents movement to the fully reclined position from the limited reclination position.

7. The seat assembly of claim 1, wherein the limit of the reclination range increases as the stroke-limiting sleeve moves closer to a seat coupler that secures the recline piston proximate to the pivot point.

8. The seat assembly of claim 7, wherein the limit of the reclination range decreases as the stroke-limiting sleeve moves closer to a backrest coupler that secures the recline piston to the backrest.

9. The seat assembly of claim 1, wherein the variable reclination range limiter comprises a moveable restricting member that is proximate to a pivot axle of the backrest.

10. A variable reclination range limiting method for a seat assembly, the variable reclination range limiting method comprising:
allowing a backrest of the seat assembly to recline over a reclination range; and
selectively adjusting a limit of the reclination range by a variable reclination range limiter, wherein the variable reclination range limiter is coupled to a recline piston and a pivot axle that defines a pivot point for the backrest, and wherein the variable reclination range limiter comprises:
a stroke-limiting sleeve mounted on a shaft of the recline piston, wherein the recline piston is configured to push and pull with respect to a bracket of the backrest about the pivot axle; and
a securing device coupled to the stroke-limiting sleeve, wherein the securing device passes through a portion of the stroke-limiting sleeve and engages a portion of the shaft of the recline piston to lock the stroke-limiting sleeve in position.

11. The variable reclination range limiting method of claim 10, further comprising securing the seat assembly to one or more seat tracks within an internal cabin of a vehicle with one or more securing studs.

12. The variable reclination range limiting method of claim 10, further comprising supporting the backrest and a seat cushion with a base.

13. The variable reclination range limiting method of claim 12, wherein the reclination range extends between a fully upright position and a fully reclined position.

14. The variable reclination range limiting method of claim 13, wherein the selectively adjusting comprises selectively adjusting the limit of the reclination range between the fully upright position and the fully reclined position.

15. The variable reclination range limiting method of claim 13, wherein the selectively adjusting comprises:
selectively adjusting the limit of the reclination range to a limited reclination position that is between the fully reclined position and the fully upright position; and
preventing movement past the limited reclination position to the fully reclined position.

16. The variable reclination range limiting method of claim 10, further comprising positioning a moveable restricting member of the variable reclination range proximate to a pivot axle of the backrest.

17. The variable reclination range limiting method of claim 10, further comprising increasing the limit of the reclination range by moving the stroke-limiting sleeve closer to a seat coupler that secures the recline piston proximate to the pivot point.

18. The variable reclination range limiting method of claim 17, further comprising decreasing the limit of the reclination range by moving the stroke-limiting sleeve moves closer to a backrest coupler that secures the recline piston to the backrest.

19. A vehicle comprising:
an internal cabin;
one or more seat tracks within the internal cabin;
a seat assembly secured to the one or more seat tracks by one or more securing studs, wherein the seat assembly comprises:
a backrest that is configured to recline over a reclination range; and
a variable reclination range limiter that is configured to selectively adjust a limit of the reclination range,
wherein the reclination range extends between a fully upright position and a fully reclined position,
wherein the variable reclination limiter selectively adjusts the limit of the reclination range to a limited reclination position that is between the fully reclined position and the fully upright position, and wherein the variable reclination limiter prevents movement to the fully reclined position from the limited reclination position, wherein the variable reclination range limiter is coupled to a recline piston and a pivot axle that defines a pivot point for the backrest, and wherein the variable reclination range limiter comprises:

a stroke-limiting sleeve mounted on a shaft of the recline piston, wherein the recline piston is configured to push and pull with respect to a bracket of the backrest about the pivot axle; and a securing device coupled to the stroke-limiting sleeve, wherein the securing device passes through a portion of the stroke-limiting sleeve and engages a portion of the shaft of the recline piston to lock the stroke-limiting sleeve in position.

20. The aircraft of claim 19, wherein the limit of the reclination range increases as the stroke-limiting sleeve moves closer to a seat coupler that secures the recline piston proximate to the pivot point, and wherein the limit of the reclination range decreases as the stroke-limiting sleeve moves closer to a backrest coupler that secures the recline piston to the backrest.

* * * * *